(12) United States Patent
Wang et al.

(10) Patent No.: US 9,689,085 B2
(45) Date of Patent: Jun. 27, 2017

(54) UNDERPOTENTIAL DEPOSITION-MEDIATED LAYER-BY-LAYER GROWTH OF THIN FILMS

(71) Applicant: Brookhaven Science Associates, LLC, Upton, NY (US)

(72) Inventors: Jia Xu Wang, East Setauket, NY (US); Radoslav R. Adzic, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 255 days.

(21) Appl. No.: 14/689,708

(22) Filed: Apr. 17, 2015

(65) Prior Publication Data

US 2015/0225869 A1   Aug. 13, 2015

Related U.S. Application Data

(63) Continuation of application No. 13/000,800, filed as application No. PCT/US2009/048213 on Jun. 23, 2009, now Pat. No. 9,034,165.

(Continued)

(51) Int. Cl.
| | |
|---|---|
| *C25D 5/18* | (2006.01) |
| *C25D 21/12* | (2006.01) |
| *B01J 21/18* | (2006.01) |
| *B01J 23/42* | (2006.01) |
| *B01J 23/44* | (2006.01) |

(Continued)

(52) U.S. Cl.
CPC ............. *C25D 21/12* (2013.01); *B01J 21/18* (2013.01); *B01J 23/42* (2013.01); *B01J 23/44* (2013.01); *B01J 37/0215* (2013.01); *B01J 37/0228* (2013.01); *B01J 37/341* (2013.01); *C25D 3/50* (2013.01); *C25D 5/18* (2013.01); *C25D 5/34* (2013.01); *C25D 7/006* (2013.01); *H01M 4/8657* (2013.01); *H01M 4/8853* (2013.01);

(Continued)

(58) Field of Classification Search
CPC .................................. C25D 5/18; C25D 7/006
See application file for complete search history.

(56) References Cited

U.S. PATENT DOCUMENTS

2006/0135359 A1* 6/2006 Adzic ................. H01M 4/8657
502/326

OTHER PUBLICATIONS

Zhai et al., "Electrochemical Designing of Au/Pt Core Shell Nanoparticles as Nanostructured Catalyst with Tunable Activity for Oxygen Reduction" Electroanalysis 19 (4), pp. 506-509 (2007).*

(Continued)

*Primary Examiner* — Bryan D. Ripa
(74) *Attorney, Agent, or Firm* — Dorene M. Price; Lars O. Husebo

(57) ABSTRACT

A method of depositing contiguous, conformal submonolayer-to-multilayer thin films with atomic-level control is described. The process involves electrochemically exchanging a mediating element on a substrate with a noble metal film by alternatingly sweeping potential in forward and reverse directions for a predetermined number of times in an electrochemical cell. By cycling the applied voltage between the bulk deposition potential for the mediating element and the material to be deposited, repeated desorption/adsorption of the mediating element during each potential cycle can be used to precisely control film growth on a layer-by-layer basis.

14 Claims, 4 Drawing Sheets

Related U.S. Application Data

(60) Provisional application No. 61/074,784, filed on Jun. 23, 2008.

(51) Int. Cl.

| | | |
|---|---|---|
| *B01J 37/02* | (2006.01) | |
| *B01J 37/34* | (2006.01) | |
| *C25D 5/34* | (2006.01) | |
| *H01M 4/86* | (2006.01) | |
| *H01M 4/88* | (2006.01) | |
| *H01M 4/92* | (2006.01) | |
| *C25D 7/00* | (2006.01) | |
| *C25D 3/50* | (2006.01) | |

(52) U.S. Cl.
    CPC .......... *H01M 4/921* (2013.01); *H01M 4/926* (2013.01); *Y02E 60/50* (2013.01)

(56) References Cited

OTHER PUBLICATIONS

Wang et al., "Overpotential Deposition of Ag Monolayer and Bilayer on Au(111) Mediated by Pb Adlayer Underpotential Deposition/Stripping Cycles" Surf. Sci. 540, pp. 230-236 (2003).*

Zhang et al., "Platinum Monolayer on Nonnoble Metal—Noble Metal Core—Shell Nanoparticle Electrocatalysts for O2 Reduction" J. Phys. Chem. B 109(48), pp. 22701-22704 (2005).*

Sasaki et al., "Pt Submonolayers on Metal Nanoparticles—Novel Electrocatalysts for H2 Oxidation and O2 Reduction" Electrochim. Acta 48, pp. 3841-3849 (2003).*

* cited by examiner

UNDERPOTENTIAL DEPOSITION-MEDIATED LAYER-BY-LAYER GROWTH OF THIN FILMS

CROSS-REFERENCE TO A RELATED APPLICATION

This application is a continuation application of copending U.S. patent application Ser. No. 13/000,800, filed on Feb. 11, 2011, which is a national phase entry under 35 U.S.C. §371 of International Application Number PCT/US2009/048213, filed on Jun. 23, 2009, entitled "UNDERPOTENTIAL DEPOSITION-MEDIATED LAYER-BY-LAYER GROWTH OF THIN FILMS", which claims the benefit of U.S. Provisional Patent Application No. 61/074,784, filed on Jun. 23, 2008, all of which are incorporated by reference as if fully set forth in this specification.

This invention was made with Government support under contract numbers DE-AC02-98CH10886 and DE-SC0012704 awarded by the U.S. Department of Energy. The Government has certain rights in the invention.

FIELD OF THE INVENTION

This invention relates generally to the controlled deposition of ultrathin films. In particular, the present invention relates to the layer-by-layer growth of uniform and conformal films with atomic-level control. The invention also relates to the formation of an ultrathin shell on a core particle and the incorporation of such core-shell particles in energy conversion devices.

BACKGROUND

Metals such as platinum (Pt), palladium (Pd), ruthenium (Ru), and related alloys are known to be excellent catalysts. When incorporated in electrodes of an electrochemical device such as a fuel cell, these materials function as electrocatalysts since they accelerate electrochemical reactions at electrode surfaces yet are not themselves consumed by the overall reaction. Although noble metals have been shown to be some of the best electrocatalysts, their successful implementation in commercially available energy conversion devices is hindered by their high cost in combination with other factors such as a susceptibility to carbon monoxide (CO) poisoning, poor stability under cyclic loading, and the relatively slow kinetics of the oxygen reduction reaction (ORR).

A variety of approaches have been employed in attempting to address these issues. One approach involves increasing the overall surface area available for reaction by forming metal particles with nanometer-scale dimensions. Loading of more expensive noble metals such as Pt has been further reduced by forming nanoparticles from alloys comprised of Pt and a low-cost component. Still further improvements have been attained by forming core-shell nanoparticles in which a core particle is coated with a thin shell of a different material which functions as the electrocatalyst. The core is usually a low cost material which is easily fabricated whereas the shell comprises a more catalytically active noble metal. An example is provided by U.S. Pat. No. 6,670,301 to Adzic, et al. which discloses a process for depositing a thin film of Pt on dispersed Ru nanoparticles supported by carbon (C) substrates. Another example is U.S. Patent Application Publ. No. 2006/0135359 to Adzic, et al. which discloses platinum- and platinum-alloy coated palladium and palladium alloy nanoparticles. Each of the aforementioned is incorporated by reference as if fully set forth in this specification. Although these approaches have produced catalysts with a higher catalytic activity and reduced noble metal loading, still further improvements are needed for electrochemical energy conversion devices to become cost-effective alternatives to conventional fossil fuel-based devices.

Practical synthesis of core-shell particles with peak activity levels requires the development of cost-effective processes which provide atomic-level control over shell formation. Such a process needs to be able to form uniform and conformal atomic-layer coatings of the desired material on a large number of three-dimensional particles having sizes as small as a few nanometers. One method of depositing a monolayer of Pt on particles of different metals involves the initial deposition of an atomic monolayer of a metal such as copper (Cu) by underpotential deposition (UPD). This is followed by galvanic displacement of the underlying Cu atoms by a more noble metal such as Pt as disclosed, for example, in U.S. Patent Application Publ. No. 2007/0264189 to Adzic, et al. Another method involves hydrogen adsorption-induced deposition of a monolayer of metal atoms on noble metal particles as described, for example, in U.S. Pat. No. 7,507,495 to Wang, et al. Both of the aforementioned are incorporated by reference as if fully set forth in this specification.

Since both of the above methods involve the galvanic displacement of adsorbed atoms by a more noble metal, the thus-deposited metal film is limited to a single monolayer. Consequently forming a shell with layer thicknesses greater than one monolayer is not feasible. A recent approach which has been developed in attempting to overcome this limitation involves diffusion-controlled hydrogen reduction of noble metal ions onto a less noble core. This has been disclosed, for example, by Y. Wang, et al. in "*Preparation Of Pd—Pt Bimetallic Colloids With Controllable Core/Shell Structures*", J. Phys. Chem. B, 101, p. 5301 (1997) which is incorporated by reference as if fully set forth in this specification. However, this method involves the use of organic solvents which severely inhibit the catalytic activity of the deposited material. Another issue is that residue from the solvent itself is difficult to remove after synthesis.

SUMMARY

Having recognized the above and other considerations, the inventors determined that there is a need to develop a simple and cost-effective process which provides atomic-level control over the deposition of uniform and conformal ultrathin films on three-dimensional particles. In view of the above-described problems, needs, and goals, some embodiments of the present invention to provide a method which affords atomic-level control over the deposition of uniform and ultrathin metal films on a plurality of particles. The method not only permits controlled layer-by-layer deposition of films with thicknesses ranging from submonolayer to multilayer coverages, but allows atomic-level control over the film uniformity on the surfaces of three-dimensional particles having sizes down to the nanoscale range.

In one embodiment this is accomplished by a method involving the use of a material deposited by underpotential deposition (UPD) to mediate the deposition of an ultrathin film by overpotential deposition (OPD). Potential cycling between the bulk deposition potential of the mediating element and the ultrathin film results in repeated cycles of desorption of the mediating element and adsorption of the material to be deposited. The mediating element controls film growth by inhibiting deposition on successive layers prior to completion of the preceding layer. Film growth thereby occurs on a layer-by-layer basis and atomically smooth films with the desired thickness can be produced. In an especially preferred embodiment the UPD mediating element is Cu and the material deposited by OPD is Pt. The process is especially advantageous for the formation of core-shell particles with precisely tailored shell thicknesses.

In another embodiment, the film growth method is used to deposit an ultrathin film on a plurality of particles which are preferably nanoparticles. In still another embodiment the particles are core-shell particles comprising a core of a transition metal coated with a contiguous adlayer of a noble metal having the targeted thickness. The core is preferably spherical or spheroidal in shape with dimensions of 2 to 100 nm along at least one of three orthogonal directions and is therefore a nanoparticle. However, the core is not so limited in terms of composition, size and shape and may comprise any of a plurality of shapes and sizes as is well-known in the art. These include, but are not limited to particles which are spherical, pyramidal, rod-shaped, cubic, tubular, cuboctahedral, and so forth.

In one embodiment the method involves immersing the nanoparticles in an electrolyte comprising a predetermined concentration of ions of the mediating element and a predetermined concentration of ions of the material to be deposited as the film. The concentration of the depositing material is preferably significantly less than that of the mediating element. In this embodiment growth is initiated at a first potential which is positive to the bulk deposition potential for the mediating element. The first potential is preferably less than that for formation of a monolayer of the mediating element by UPD, but is not so limited. The applied potential is then swept at a first sweep rate in a positive direction which leads to desorption of the mediating element and the concomitant deposition of the desired material.

At a second potential which is less than the bulk deposition potential of the material to be deposited, the sweep direction is stopped and swept in the reverse direction at a second sweep rate. The second potential is preferably a point at which the mediating element is nearly completely removed whereas the depositing material remains. The reverse sweep results in adsorption of the mediating element, thereby preventing deposition of the desired material before the underlying layer has been completed. Stated in other words, film growth by OPD is mediated by UPD of the mediating element. By sweeping the applied potential in continuous cycles between the set lower and upper potential limits, deposition of an ultrathin film with atomic-level control over the thickness can be attained. The deposition rate may be varied through suitable selection of the potential cycling range and overall scan rate. In a preferred embodiment the first and second sweep rates are equal and the sweep rate is constant in time. In still another preferred embodiment the potential cycles are stopped at a potential which is positive enough to completely remove the mediating element.

In yet another embodiment the method involves initially forming a continuous adlayer of a mediating element having a thickness of up to one monolayer on the surface of the particles prior to commencement of the potential sweeps. The initial layer of the mediating element is preferably deposited by UPD although other film growth techniques may be used.

Although in these embodiments the initial potential sweep is in the positive direction, it can proceed in either a positive direction from the low potential limit or a negative direction from the high potential limit. During a negative potential sweep, the mediating element and depositing material co-deposit on the substrate with the former being predominant because there is a significantly higher concentration of the mediating element in solution. This lowers the probability of forming three-dimensional clusters of the depositing material. In a positive potential sweep atoms of the mediating element are desorbed from the surface. Individual atoms or small two-dimensional clusters of the material to be deposited can then diffuse to highly coordinated sites. In this manner empty sites in the surface layer are filled up before a subsequent layer is deposited.

In a preferred embodiment the shell is a monolayer of Pt deposited onto a transition metal core. However, the metal overlayer is not limited to Pt, but may comprise any of a plurality of metals wherein the surface Pt layer is alloyed with one or more transition metals which may include, but are not limited to, iridium (Ir), osmium (Os), rhenium (Re), rhodium (Rh), Ru, and/or Pd. Similarly, the core may also comprise any of a plurality of transition metals which includes cobalt (Co), nickel (Ni), iron (Fe), Ir, Pt, Os, Re, Rh, Au, or Ru either alone or as an alloy. The metal shell is not limited to a single monolayer of the metal or alloy, but may also be comprised of submonolayers or multilayers of the metal or alloy. A submonolayer may be obtained by incomplete surface coverages whereas multilayers may be obtained by repeated potential cycles. Repeated cycles are also favored to ensure complete coverage of the underlying substrate by the metal overlayer. The mediating element is preferably either Cu, lead (Pb), thallium (Tl), or bismuth (Bi) which are present in an electrolyte as $Cu^{2+}$, $Pb^{2+}$, $Tl^{1+}$, or $Bi^{3+}$ at predetermined concentrations.

The attainment of atomic-level control over film growth permits a reduction in loading of precious metals while simultaneously maximizing the available catalytically active surface area. Particles with ultrathin films formed using UPD-mediated layer-by-layer growth facilitate more efficient and cost-effective electrochemical energy conversion in fuel cells, metal-air batteries, and during corrosion processes.

DETAILED DESCRIPTION

Figure 1:
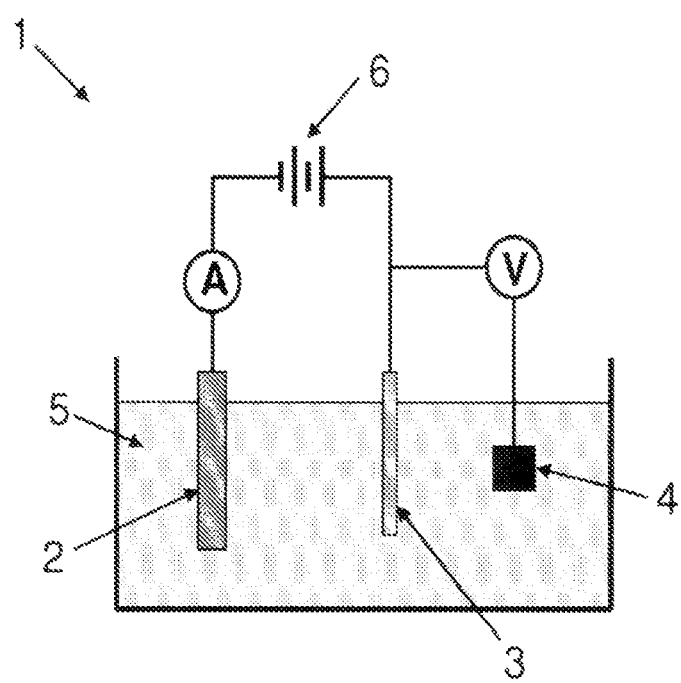
FIG. 1 shows a basic three-electrode electrochemical cell.

In the interest of clarity, in describing the present invention, the following terms and acronyms are defined as provided below:

ACRONYMS

ALD: Atomic Layer Deposition
CVD: Chemical Vapor Deposition
ICP: Inductively Coupled Plasma
MBE: Molecular Beam Epitaxy
NHE: Normal Hydrogen Electrode
OPD: Overpotential Deposition
ORR: Oxidation Reduction Reaction
PLD: Pulsed Laser Deposition
TEM: Transmission Electron Microscopy
UPD: Underpotential Deposition

DEFINITIONS

Adatom: An atom located on the surface of an underlying substrate.
Adlayer: A layer of atoms adsorbed to the surface of a substrate.
Bilayer: Two monolayers, one directly on top of the other.
Catalysis: A process by which the rate of a chemical reaction is increased by means of a substance (a catalyst) which is not itself consumed by the reaction.
Electrocatalysis: The process of catalyzing a half cell reaction at an electrode surface by means of a substance (an electrocatalyst) which is not itself consumed by the reaction.
Electrodeposition: Another term for electroplating.
Electroplating: The process of using an electrical current to reduce cations of a desired material from solution to coat a conductive substrate with a thin layer of the material.
Monolayer: A single layer of atoms or molecules which occupies all available surface sites and hence covers the entire exposed surface of the substrate.
Multilayer: More than one layer of atoms or molecules on the surface, with each layer being sequentially stacked on top of the preceding layer.
Nanoparticle: Any manufactured structure or particle with nanometer-scale dimensions (i.e., 1-100 nm).
Nanostructure: Any manufactured structure with nanometer-scale dimensions.
Noble metal: Metals which are extremely stable and inert, being resistant to corrosion or oxidation. These generally comprise ruthenium (Ru), rhodium (Rh), palladium (Pd), silver (Ag), rhenium (Re), osmium (Os), iridium (Ir), platinum (Pt), and gold (Au). Noble metals are frequently used as a passivating layer.
Non-noble metal: A transition metal which is not a noble metal.
Overpotential Deposition: A phenomenon involving the electrodeposition of a species at a potential which is negative to the equilibrium or Nernst potential for the reduction of the metal.
Redox reaction: A chemical reaction wherein an atom undergoes a change in oxidation number. This typically involves the loss of electrons by one entity accompanied by the gain of electrons by another entity.
Refractory metal: A class of metals with extraordinary resistance to heat and wear, but with generally poor resistance to oxidation and corrosion. These generally comprise tungsten (W), molybdenum (Mo), niobium (Nb), tantalum (Ta), and rhenium (Re).
Submonolayer: Surface atom or molecular coverages which are less than a monolayer.
Transition metal: Any element in the d-block of the periodic table which includes groups 3 to 12.
Underpotential Deposition: A phenomenon involving the electrodeposition of a species at a potential which is positive to the equilibrium or Nernst potential for the reduction of the metal.

This invention is based on the discovery that deposition of a thin, contiguous layer of a material onto a substrate can be controlled on a layer-by-layer basis by utilizing UPD potential cycles to enhance the interlayer diffusion rate during diffusion-controlled OPD of an ultrathin film onto a substrate. Using Pd particles as an illustrative example, the UPD of Cu may be used to mediate the OPD of Pt atoms onto the Pd surface. In one embodiment deposition starts at a potential near that required for bulk Cu deposition where a monolayer of Cu covers the Pd surface. As the Cu monolayer is partially stripped during a positive potential sweep, Pt is deposited under diffusion-limited conditions. When the potential sweep is reversed and proceeds in the negative direction, UPD of Cu atoms occurs on the deposited Pt atoms, thereby preventing the nucleation and growth of second and subsequent atomic layers of Pt atoms before the first layer is completed.

In another embodiment growth starts at a potential negative to that for bulk Pt deposition. In this case the initial potential sweep is in the negative direction and is reversed at a potential positive to that required for bulk Cu deposition. During the initial negative sweep both Cu and Pt are co-deposited onto the Pd surface. The role of Cu during UPD deposition/stripping is to slow down the Pt deposition rate and to enhance the Pt interlayer diffusion rate. As a result, Pt atoms which are added during each potential cycle can migrate to more energetically favorable sites, thereby enabling the layer-by-layer growth of Pt. Furthermore, the observed current response during each potential cycle serves as an in-situ monitor of the Pt deposition process.

Although the Cu-mediated deposition of Pt onto Pd substrates as described above is used throughout this specification as an illustrative example which demonstrates the spirit and scope of the present invention, it is to be understood that this material system is merely exemplary of many possible combinations of suitable materials which may be used. Any suitable alternative material system (e.g., combination of substrate, film, and mediating element) which is capable of accomplishing layer-by-layer growth of a thin coating or shell may be used. This includes all metals as well as semiconductors and mixtures or alloys of these.

I. Particle Synthesis

Initially particles of a suitable metal or metal alloy are prepared using any technique which is well-known in the art. It is to be understood, however, that the invention is not limited to deposition onto metal particles and may include other materials which are well-known in the art including semiconductors. Furthermore, the substrate is not limited to particles as described throughout this specification and may include any suitable substrate as is well-known in the art. It is these particles onto which a thin film of the desired material will be deposited. The particles may be comprised of a single element or material throughout or, in another embodiment, may be a particle alloy. A particle alloy is defined as a particle formed from a complete solid solution of two or more elemental metals. The particle alloy preferably comprises at least one noble metal alloyed with a transition metal. In another embodiment the particles may be core-shell particles. The core preferably comprises a non-noble transition metal whereas the shell is a noble metal.

The particles are preferably spherical or spheroidal with a size ranging from 2 to 100 nm along at least one of three orthogonal dimensions and are thus nanometer-scale particles or nanoparticles. It is to be understood, however, that the particles may take on any shape, size, and structure as is well-known in the art. This includes, but is not limited to branching, conical, pyramidal, cubical, cylindrical, mesh, fiber, cuboctahedral, and tubular nanoparticles. It is further understood that the size is not limited to the nanometer range and may extend into the micrometer and millimeter range. The nanoparticles may be agglomerated or dispersed, formed into ordered arrays, fabricated into an interconnected mesh structure, either formed on a supporting medium or suspended in a solution, and may have even or uneven size distributions. The particle shape and size is preferably configured to maximize surface catalytic activity. Throughout this specification, the particles will be primarily disclosed and described as nanoparticles which are essentially spherical in shape.

Nanoparticles, which are also known as nanocrystals or quantum dots have been formed from a wide variety of materials using a number of different techniques which involve both top-down and bottom-up approaches. Examples of the former include standard photolithography techniques, dip-pen nanolithography, and focused ion-beam etching. The latter comprises techniques such as electrodeposition or electroplating onto templated substrates, laser ablation of a suitable target, vapor-liquid-solid growth of nanowires, and growth of surface nanostructures by thermal evaporation, sputtering, chemical vapor deposition (CVD), or molecular beam epitaxy (MBE) from suitable gas precursors and/or solid sources.

Nanoparticles may also be formed using conventional powder-processing techniques such as comminution, grinding, or chemical reactions. Examples of these processes include mechanical grinding in a ball mill, atomization of molten metal forced through an orifice at high velocity, centrifugal disintegration, sol-gel processing, or vaporization of a liquefied metal followed by supercooling in an inert gas stream. Nanoparticles synthesized by chemical routes may involve solution-phase growth in which, as an example, sodium boron hydride, superhydride, hydrazine, or citrates may be used to reduce an aqueous or nonaqueous solution comprising salts of a non noble metal and noble metal. Alternatively, the salt mixtures may be reduced using $H_2$ gas at temperatures ranging from 150° C. to 1,000° C. Powder-processing techniques are advantageous in that they are generally capable of producing large quantities of nanometer-scale particles with desired size distributions.

It is to be understood that the methods of forming the nanoparticles as described above are merely exemplary. Any of a plurality of alternative methods which are well-known in the art and which are capable of forming nanoparticles with the desired shape, size, and composition may be employed.

II. Underpotential Deposition-Mediated Film Growth

Once nanoparticles having the desired shape, composition, and size distribution have been fabricated, the desired ultrathin film may then be deposited. The process described below permits deposition of ultrathin films having thicknesses in the submonolayer-to-multilayer thickness range with atomic-level control. In this manner, deposition may be controlled to within a fraction of an atomic surface layer. For purposes of this specification, a monolayer is formed when the substrate surface is fully covered by a single layer comprising adatoms which form a chemical or physical bond with the atoms of the underlying substrate. If the surface is not completely covered (e.g., not all surface sites are occupied by an adatom), then the surface coverage is termed submonolayer. However, if additional layers are deposited onto the first layer, then multilayer coverages result. If two successive layers are formed, then it is termed a bilayer and if three successive layers are formed, then the resultant film is a trilayer and so on. The materials chemistry underlying the present invention may be best understood through an initial description of a three-electrode electrochemical cell. This is followed by a description of the principles governing underpotential deposition-mediated layer-by-layer growth.

A. Electrochemical Cells

The basic setup of a three-electrode system (1) is illustrated in FIG. 1. Here, the three electrodes are identified as the counter electrode (2), the working electrode (3), and the reference electrode (4). The reaction of interest occurs between an electrolyte (5) and the exposed surfaces of the working electrode (3). The half-cell reactivity of the electrolyte (5) is measured by varying the potential of the working electrode (3) and measuring the resulting current flow. The counter electrode (2) serves as the other half of the half-cell and balances the electrons which are added or removed at the working electrode (3).

In order to determine the potential of the working electrode (3), the potential of the counter electrode (2) must be known. Completion of the redox reactions occurring at the working electrode (3) requires that a constant potential be maintained at both electrodes while the necessary current is permitted to flow. In practice this is extremely difficult to accomplish using a two-electrode system. This issue may be solved by introducing the reference electrode (4) to divide the role of supplying electrons and maintaining a reference potential between two separate electrodes. The reference electrode (4) is a half cell with a known reduction potential. It acts as a reference in the measurement and control of the potential of the working electrode (3). The reference electrode (4) does not pass any current to or from the electrolyte; all current needed to balance the reactions occurring at the working electrode flows through the counter electrode (2).

The sole purpose of the counter electrode (2) is to permit the flow of electrical current from the electrolyte (5). Consequently the counter electrode (2) can be nearly any material as long as it is a good conductor and does not react with the electrolyte. Most counter electrodes (2) are fabricated from a thin Pt wire since it is a good electrical conductor and is electrochemically inert. The reference electrode (4) has a stable and well-known electrode potential which is usually attained by means of a redox system having constant concentrations of each participant in the redox reaction. Examples include a normal hydrogen electrode (NHE) or a silver-silver chloride (Ag/AgCl) reference electrode. The reference electrode (4) provides a standard potential against which the potential at the working electrode (3) can be measured.

In a typical setup, the electrodes of the three-electrode electrochemical cell are static and sit in unstirred solutions of the desired electrolyte. The electrochemical reactions occurring at the exposed surface of the working electrode (3) can be controlled and analyzed by varying the electrode potential with time and measuring the resulting current flow. The potential is measured between the reference electrode (4) and the working electrode (3) whereas the current is measured between the working electrode (3) and the counter electrode (2). In general, the potential is changed linearly with time such that oxidation or reduction of species at the electrode surface can be analyzed through changes in the current signal as is performed during linear voltammetry measurements. Oxidation is registered as an increase in current whereas reduction results in a decrease in the current signal. The resultant peaks and troughs can be analyzed and information on the kinetics and thermodynamics of the system can be extracted. If the electrolyte is redox active it may display a reversible wave in which the electrolyte is reduced (or oxidized) during a linear sweep in the forward direction and is oxidized (or reduced) in a predictable manner when the potential is stopped and then swept in the reverse direction such as during cyclic voltammetry.

In conventional electrodeposition a cation contained in solution is reduced by the flow of electrical current through a conductive substrate. At the substrate surface, electrons combine with and thereby reduce cations in solution to form a thin film on the surface of the substrate itself. In order for the overall reaction to proceed, the reduction of cations at one electrode must be counterbalanced by oxidation at a second electrode. In a standard electroplating setup the part to be plated is the cathode whereas oxidation occurs at the anode. The cathode is connected to the negative terminal of an external power supply (e.g., component (6) in FIG. 1) whereas the anode is connected to the positive terminal. When the power supply is activated, the material constituting the anode is oxidized to form cations with a positive charge whereas cations in solution are reduced and thereby plated onto the surface of the cathode. The cathode and anode in an electroplating cell are analogous to the working electrode (3) and counter electrode (2), respectively, in the three-terminal cell of FIG. 1.

For conventional metals there is generally a bulk deposition potential (or Nernst potential) which is necessary for deposition of the metal itself to proceed. It is known that for certain metals it is possible to deposit a single monolayer or bilayer of the metal onto a substrate of a different metal at potentials positive to the bulk deposition potential. In this case, formation of the metal monolayer occurs before bulk deposition can proceed. This phenomenon is known as underpotential deposition (UPD) and it occurs when the adatom-substrate bonding is stronger than the adatom-adatom bonding. An example is provided by Brankovic, et al. which discloses the use of UPD to form an adlayer of Cu onto Pd substrates in "*Metal Monolayer Deposition by Replacement of Metal Adlayers on Electrode Surfaces,*" Surf. Sci., 474, L173 (2001) which is incorporated by reference as if fully set forth in this specification. The process used to form adlayers by UPD is generally reversible. By sweeping the applied potential in one direction, a monolayer of the desired material may be deposited whereas a sweep in the reverse direction results in desorption of the thus-formed monolayer.

B. Ultrathin Film Growth

The UPD-mediated deposition process is centered around a series of electrochemical reactions which, when performed sequentially result in an ultrathin film with the targeted surface coverage. In one embodiment, the procedure involves the initial formation of an adlayer of a material onto a substrate. This is preferably accomplished by UPD, but other deposition techniques may be used. The present invention is best illustrated by use of an exemplary embodiment. The deposition process will therefore be described with reference to the UPD of Cu atoms on carbon-supported Pt (Pt/C) and Pd (Pd/C) particles as shown by the cyclic voltammetry curves in FIG. 2A. Throughout this specification, the voltammetry curves are shown with the current in milliamps per square centimeter ($mA/cm^2$) on the vertical axis and the applied potential in Volts (V) on the horizontal axis. A Pt wire is used as the counter electrode and a Ag/AgCl/(3 M NaCl) electrode was used as the reference electrode. All reported potentials have been referenced to the normal hydrogen electrode (NHE).

Figure 2A:
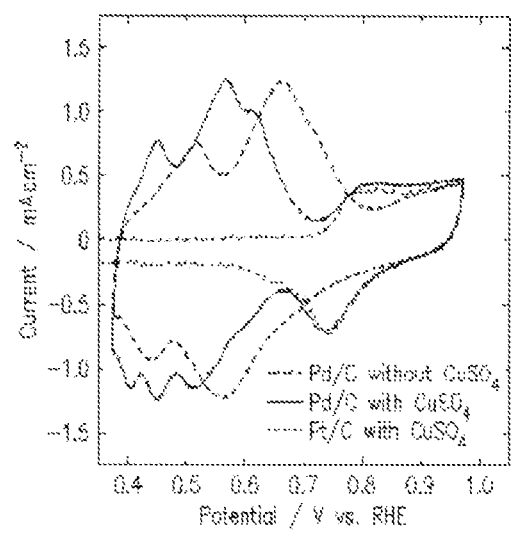
FIG. 2A shows voltammetry curves for underpotential deposition of Cu on carbon-supported Pt and Pd particles.

In FIG. 2A, the dotted-dashed line represents the voltammetry curve for Pd/C in pure sulfuric acid ($H_2SO_4$) whereas the solid and dashed lines represent voltammetry curves for Pd/C and Pt/C, respectively, in a solution comprising 50 mM $H_2SO_4$ and 50 mM $CuSO_4$. The scan rate was 30 mV/s for all samples shown in FIG. 2A. The difference between the curves on Pd/C in solution without $Cu^{2+}$ (dotted-dashed) and with $Cu^{2+}$ (solid) show that Cu monolayer deposition occurs in the potential range from 0.36 to 0.70 V On Pd/C. Above 0.7 V Pd surface oxidation occurs in both solutions. The Cu UPD voltammetry curve for Pt/C is provided along with that for Pd/C to demonstrate the shift in Cu deposition/stripping peaks arising due to UPD on different substrates. The Cu peaks are shifted to higher potentials on Pt than on Pd because Cu creates a stronger bond with Pt than Pd.

Figure 2B:
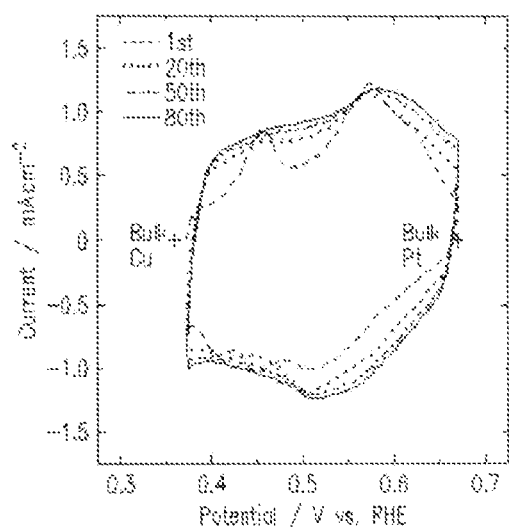
FIG. 2B illustrates changes in the voltammetry features after underpotential deposition-mediated layer-by-layer growth of Pt on carbon-supported Pd and Pt after 1, 20, 50, and 80 cycles.

Deposition of a monolayer of Pt onto Pd/C or Pt/C particles may be accomplished, for example, by the initial UPD of Cu as described above followed by immersion in a separate solution comprised of 1.0 mM $K_2PtCl_4$ in 50 mM $H_2SO_4$. Since Pt is more noble than Cu, the Cu adatoms are replaced by Pt via galvanic displacement as described, for example, in U.S. Patent Appl. No. 2006/0135359 to Adzic, et al. However, this process is limited to the deposition of one Pt layer for each UPD Cu layer. Growth of additional monolayers of Pt with atomic-level control may be obtained by using an electrolyte comprising salts of both Cu and Pt. By cycling between the bulk deposition potential of Cu and Pt, it is possible to mediate Pt growth via UPD of Cu and overpotential deposition (OPD) of Pt. This process will be described with reference to FIG. 2B which shows voltammetry curves for growth of a Pt monolayer on carbon supported Pd nanoparticles, Pd/C. The plus signs in FIG. 2B identify the bulk deposition potentials for Cu (360 mV) and Pt (670 mV).

In one embodiment the surface has an initial layer of Cu deposited preferably by UPD prior to initiation of potential cycling. In this example, the Pd/C (or Pt/C) particles are covered with a monolayer of Cu atoms. In this embodiment, as the potential is continuously increased Cu atoms are gradually desorbed from the surface and replaced by Pt atoms contained in solution.

UPD-mediated growth is carried out in an electrolyte comprising 50 mM $H_2SO_4$, 50 mM $CuSO_4$, and 0.1 mM $K_2PtCl_4$ by potential cycling between the Cu and Pt bulk deposition potentials at a sweep rate of 30 mV/s. The initial potential sweep can be either in a positive direction from the low potential limit or in a negative direction from the high potential limit. During a negative potential sweep, the Cu and Pt co-deposit on Pd with the former as the majority because the Cu to Pt concentration ratio is 500:1 in solution. This lowers the probability of forming three-dimensional Pt clusters. The low potential limit is greater than the bulk deposition potential of Cu and, in a preferred embodiment, is less than the potential at which a monolayer of Cu forms on the surface. The high potential limit is less than the bulk deposition potential of Pt and is preferably the potential at which Cu is completely removed from the surface.

In a positive potential sweep Cu atoms are desorbed from the surface. Individual Pt atoms or small two-dimensional Pt clusters can then diffuse to highly coordinated sites, i.e., filling up the empty sites in the surface layer rather than staying on top of it. As the number of potential cycles increases there is a continuous increase in the current indicating the continuous increase in surface area as the coverage of Pt on Pd nanoparticles increases. The number of potential cycles required to obtain a Pt monolayer was determined by comparing the rate of increase in measured surface area with the values expected based on the average Pd particle size.

Figure 3:
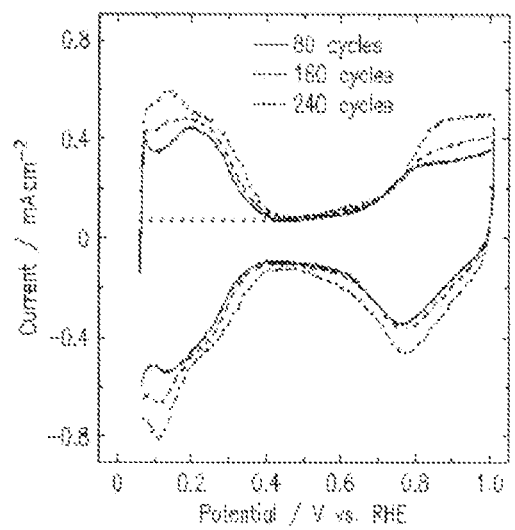
FIG. 3 shows changes in the voltammetry features after the deposition of Pt on carbon-supported Pd particles over 80, 160, and 240 cycles.

Measurements of the particles' surface areas after Cu-UPD mediated Pt deposition will now be described with reference to FIG. 3. The voltammetry curves were obtained in a solution of 0.1 M $HClO_4$ at a sweep rate of 50 mV/s for the Pd/C particles after UPD-mediated Pt depositions of 80, 160, and 240 potential cycles. An increase in current on the samples with thicker Pt shells made by more potential cycles indicates that the surface area of Pd(core)-Pt(shell) nanoparticles increases significantly. Integrating the current from 0.05 to 0.4 V in the positive potential sweep (marked by the dotted line in FIG. 3.) yields the charge for hydrogen desorption from the surface, which is proportional to the surface area of Pt—Pd/C particles. For a 5-nm diameter Pd core, the surface area on a 2- and 3-monolayer thick Pt shell is expected to be 21% and 44% larger than that on a 1-monolayer Pt shell based on a near-sphere particle model. The area ratios measured by hydrogen charges are consistent with this prediction. In addition, the amount of Pt deposited may be accurately correlated with the number of potential cycles by, for example, performing inductively coupled plasma (ICP) measurements of the Pt:Pd ratio. The core-shell structure may also be examined directly by transmission electron microscopy (TEM). These results demonstrate that the thickness of Pt shell can be easily controlled over the submonolayer-to-multilayer thickness range by UPD-mediated deposition over a predetermined number of potential cycles.

Figure 4:
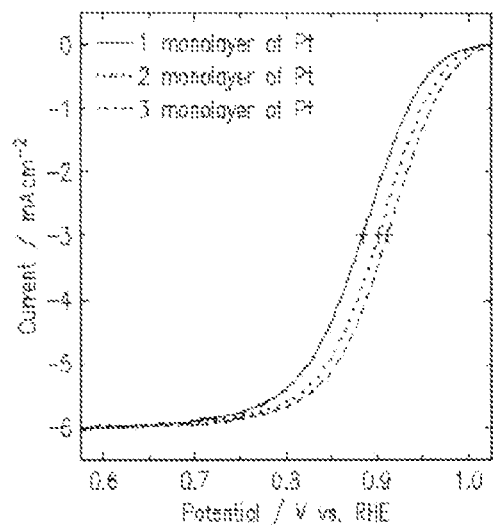
FIG. 4 shows the activity level of the oxidation reduction reaction after the deposition of 1, 2, and 3 monolayers of Pt on carbon-supported Pd particles.

The ORR activity for the Pt—Pd/C samples discussed above was measured using the rotating disc electrode technique and the results are shown in FIG. 4. The positive shift of half-wave potential (plus signs) with increasing Pt shell thickness illustrate that the ORR activity can be tailored by controlling the Pt shell thickness to achieve high precious metal mass activity and improve the catalysts' durability, which are crucially important for commercialization of fuel cells.

It is to be understood that the UPD-mediated process which has been described above is not limited to Pt growth on Pd particles nor is it limited to the use of Cu as the UPD-mediating material. The metal overlayer may be formed from any other suitable metal, particularly noble metals such as Ir, Os, Re, Ru, Rh, Au, and/or Pd. The only requirement is that the metal to be deposited have a bulk deposition potential higher than the corresponding mediating agent. Solutions containing more than one noble metal may be used to deposit an alloy shell. Furthermore, the mediating agent itself must be capable of forming an adlayer on another substrate by UPD.

The particles constituting the substrate onto which the ultrathin film is deposited may be of a single material, or may be a solid solution formed from two or more materials such as, for example, PdCo, PdFe, or AuNi binary alloys. In an alternate embodiment the particles themselves comprise core-shell particles having a core of a non-noble transition metal such as Ni, Co, Fe, titanium (Ti), tungsten (W), niobium (Nb), or tantalum (Ta) may be coated with a more noble metal such as gold (Au), Pd, or Pt. Examples include cores of PdCo, PdFe, and AuNi either as an alloy particle or as a core-shell particle.

UPD-mediated layer-by-layer growth is a nearly ideal method for the formation of certain core-shell nanoparticle electrocatalysts such as the Pt—Pd/C system described above. The process offers unprecedented control over film growth in the submonolayer-to-multilayer thickness range and is advantageous in terms of its versatility, reproducibility, and efficient utilization of source material. Since a costly precious metal such as Pt can be utilized as a submonolayer-to-multilayer thin film instead of in bulk form, significant cost savings can be attained. The catalytic activity of the final coated particle may be controlled by engineering the electronic properties and lattice parameter of the underlying core-shell or alloy particle. Furthermore, the high area-specific activity demonstrated by particles fabricated using UPD-mediated layer-by-layer growth may contribute to achieving the best overall performance in activity, stability, and cost for ORR electrocatalysts through optimization of the core-shell structure.

Figure 5:
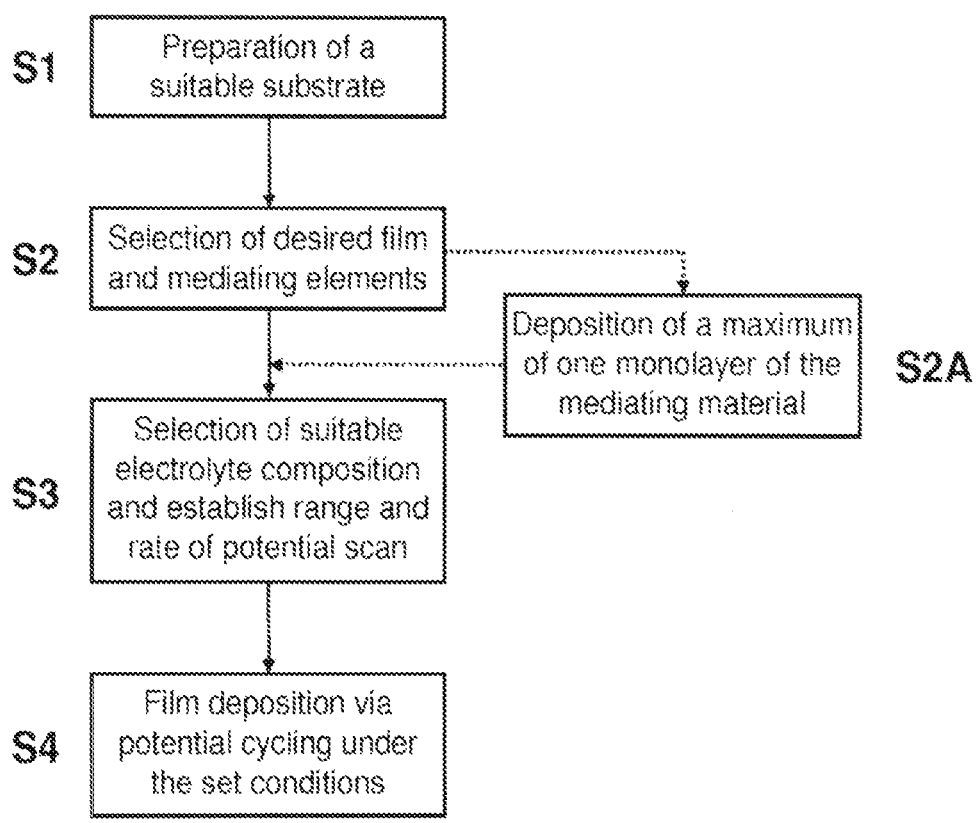
FIG. 5 is a flowchart showing the sequence of steps performed during underpotential deposition-mediated layer-by-layer growth.

A generic description of UPD-mediated layer-by-layer growth of ultrathin films will now be described in detail with reference to FIG. 5. The process flow illustrated in FIG. 5 is intended to describe the best mode of practicing the invention. It is to be understood that there are many possible variations which do not deviate from the spirit and scope of the present invention.

III. Exemplary Embodiment

An exemplary embodiment of the present invention will now be described in detail with reference to FIG. 5 which shows the overall process flow for UPD-mediated layer-by-layer growth. The process provided in FIG. 5 is a pictorial illustration of the general process flow followed to perform UPD-mediated growth of a thin film of the desired material. Initially, in step S1, a suitable substrate is prepared. This may be any substrate onto which atomic layers of the desired material may be formed. In a preferred embodiment the substrate comprises spherical Pd nanoparticles or core-shell nanoparticles having a Pd shell and a core of Fe, Co, or Ni. The nanoparticles are preferably 2 to 10 nm in diameter and may be formed using any process or method as is well-known in the art, including those described in Section I above.

UPD-mediated layer-by-layer growth can be attained through selection of the appropriate mediating element and material to be deposited as a thin film in step S2. The mediating element must be capable of underpotential deposition at potentials below that of the material to be deposited in order to facilitate potential cycling between the bulk deposition potential for the two elements. More specifically, two primary conditions must be satisfied. First, the mediating element must exhibit underpotential deposition. Some examples include Cu, lead (Pb), thallium (Tl), and bismuth (Bi). Second, the concentration of the depositing material should be significantly lower than that of the mediating element, and the bulk deposition potential for the mediating element must be less than that of the depositing material by an amount sufficient to provide atomic-level control over the adsorption and desorption processes.

In an optional step S2A, deposition of up to one monolayer of the mediating element onto the substrate surface is performed prior to potential cycling. This is preferably done by UPD, but is not limited to this technique. Other possibilities include atomic layer deposition (ALD), MBE, pulsed laser deposition (PLD), or CVD. Formation of this monolayer results in desorption of the mediating element and adsorption of the film material during the forward sweep.

Step S3 involves selection and preparation of a suitable electrolyte and determination of the number and range of the potential cycles to be performed. The mediating and film materials must be available in the form of a suitable salt which can be dissolved in solution to form an electrolyte with the required concentrations. Furthermore, the salts must be capable of undergoing reversible redox electrochemical reactions using an apparatus such as the electrochemical cell illustrated in FIG. 1. The low potential limit is preferably above the bulk deposition potential of the mediating element, yet is less than the potential for the formation of a monolayer of the mediating element on the surface. However, slightly higher potentials may be used. The upper potential limit is preferably that at which the mediating element is completely removed from the surface and the depositing material remains. In some cases this potential may be significantly lower or higher than the bulk potential of the depositing material.

The final step, S4 involves the actual deposition process itself. The substrate to be coated is immersed in solution and the applied potential is cycled between the set minimum and maximum values at the prescribed scan rate. Potential cycling is preferably stopped at a potential where the mediating element is completely removed and the depositing material remains. After deposition, the substrate is removed from solution, rinsed with deionized water and blown dry. The final product comprises particles having a thin film with a thickness which can be specified and controlled at the atomic level.

In a preferred application, particles coated using the process described in this specification may be used as the cathode in a fuel cell. This application is, however, merely exemplary and is being used to describe a possible implementation of the present invention. Implementation as a fuel cell cathode is described, for example, in U.S. Patent Appl. No. 2006/0135,359 to Adzic. It is to be understood that there are many possible applications which may include, but are not limited to $H_2$ sensors, charge storage devices, applications which involve corrosive processes, as well as various other types of electrochemical or catalytic devices.

It will be appreciated by persons skilled in the art that the present invention is not limited to what has been particularly shown and described hereinabove. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. patents, and U.S. patent application Publications cited throughout this specification are hereby incorporated by reference as if fully set forth in this specification.

The invention claimed is:

1. A method for controllably forming a submonolayer to multilayer thick noble metal film on a substrate comprising electrochemically exchanging a mediating element on said substrate with a noble metal film by alternatingly sweeping potential in forward and reverse directions for a predetermined number of times in an electrochemical cell in which said substrate is immersed in an electrolyte solution comprising predetermined concentrations of cations of said mediating element and cations of said noble metal wherein said forward potential sweeps are initiated at a first potential which is greater than a bulk deposition potential of said mediating element and are stopped at a second potential at which the mediating element is displaced from said substrate and the noble metal is deposited on said substrate and wherein said reverse potential sweeps initiate at said second potential and end at said first potential and wherein said alternation of sweeps begins with sweeps in either said forward or said reverse potential directions.

2. The method of claim 1 wherein up to one monolayer of the mediating element is formed on the substrate prior to immersion in the electrolyte solution.

3. The method of claim 1 wherein the substrate comprises nanoparticles.

4. The method of claim 3 wherein the nanoparticles are core-shell nanoparticles.

5. The method of claim 4 wherein the core comprises a non-noble metal.

6. The method of claim 4 wherein the nanoparticles comprise a noble metal.

7. The method of claim 4 wherein the mediating element is a metal selected from the group consisting of Cu, Pb, Tl and Bi.

8. The method of claim 1 wherein the noble metal is Pt.

9. A method for controllably forming a submonolayer to multilayer thick Pt metal film on a substrate comprising electrochemically exchanging a film of Cu on said substrate with a Pt film by alternatingly sweeping potential in forward and reverse directions for a predetermined number of times in an electrochemical cell in which said substrate is immersed in an electrolyte solution comprising predetermined concentrations of Cu cations and Pt cations wherein said forward potential sweeps are initiated at a first potential which is greater than a bulk deposition potential of the Cu cations and are stopped at a second potential at which Cu is displaced from said substrate and Pt is deposited on said substrate and wherein said reverse potential sweeps initiate at said second potential and end at said first potential and wherein said alternation of sweeps begins with sweeps in either said forward or said reverse potential directions.

10. The method of claim 9 wherein up to one monolayer of Cu is formed on the substrate prior to immersion in the electrolyte solution.

11. The method of claim 9 wherein the substrate comprise nanoparticles.

12. The method of claim 10 wherein the nanoparticles are core-shell nanoparticles.

13. The method of claim 12 wherein the core comprises a non-noble metal.

14. The method of claim 12 wherein the nanoparticles comprise a noble metal.

* * * * *